US012590797B2

(12) United States Patent
Morash

(10) Patent No.: US 12,590,797 B2
(45) Date of Patent: Mar. 31, 2026

(54) METHOD TO REQUALIFY DIE AFTER STORAGE

(71) Applicant: Pratt & Whitney Canada Corp., Longueuil (CA)

(72) Inventor: Michael Morash, Avondale (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 293 days.

(21) Appl. No.: 18/392,935

(22) Filed: Dec. 21, 2023

(65) Prior Publication Data

US 2025/0205778 A1      Jun. 26, 2025

(51) Int. Cl.
| | |
|---|---|
| *G01B 11/02* | (2006.01) |
| *G01B 9/00* | (2006.01) |
| *G01B 11/00* | (2006.01) |
| *G01B 11/06* | (2006.01) |
| *G01M 15/14* | (2006.01) |
| *G06T 17/00* | (2006.01) |

(52) U.S. Cl.
CPC .............. *G01B 11/02* (2013.01); *G01B 9/00* (2013.01); *G01B 11/00* (2013.01); *G01B 11/06* (2013.01); *G01M 15/14* (2013.01); *G06T 17/00* (2013.01)

(58) Field of Classification Search
CPC .......... G01B 11/02; G01B 9/00; G01B 11/00; G01B 11/06; G01M 15/14; G06T 17/00; B22C 9/00; B22D 46/00
See application file for complete search history.

(56) References Cited

U.S. PATENT DOCUMENTS

| | | |
|---|---|---|
| 9,721,044 B2 | 8/2017 | Bewlay et al. |
| 2015/0096707 A1 | 4/2015 | Hintze et al. |
| 2023/0184041 A1* | 6/2023 | Lyles ...................... G06F 18/24 |
| | | 702/34 |

FOREIGN PATENT DOCUMENTS

| | | |
|---|---|---|
| CN | 115592351 | 1/2023 |
| CN | 115578429 | 5/2023 |

OTHER PUBLICATIONS

European Search Report for EP Application No. 24218872.0 dated Apr. 14, 2025.

* cited by examiner

*Primary Examiner* — Christopher Wait
(74) *Attorney, Agent, or Firm* — Carlson, Gaskey & Olds, P.C.

(57) ABSTRACT

A method of requalifying a die after storage under this disclosure could be said to include the steps of running production parts on a die, stopping production for a period of time, taking a pre-storage 3D scan of the die, storing the die for a period of time, taking a post storage 3D scan of the die, comparing the post storage 3D scan information to the pre-storage 3D scan information, and requalifying the die for use in production should the post storage 3D scan be found to be sufficiently close to the pre-storage 3D scan.

20 Claims, 4 Drawing Sheets

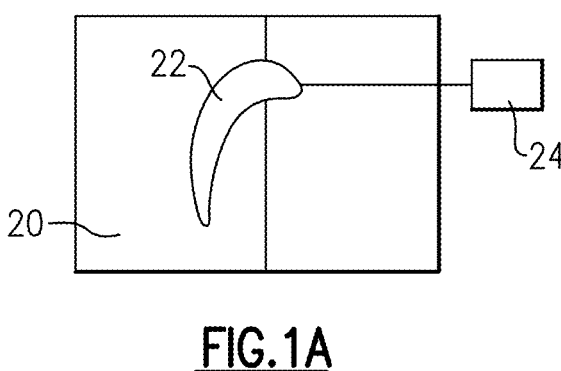
FIG.1A
FIG.1B
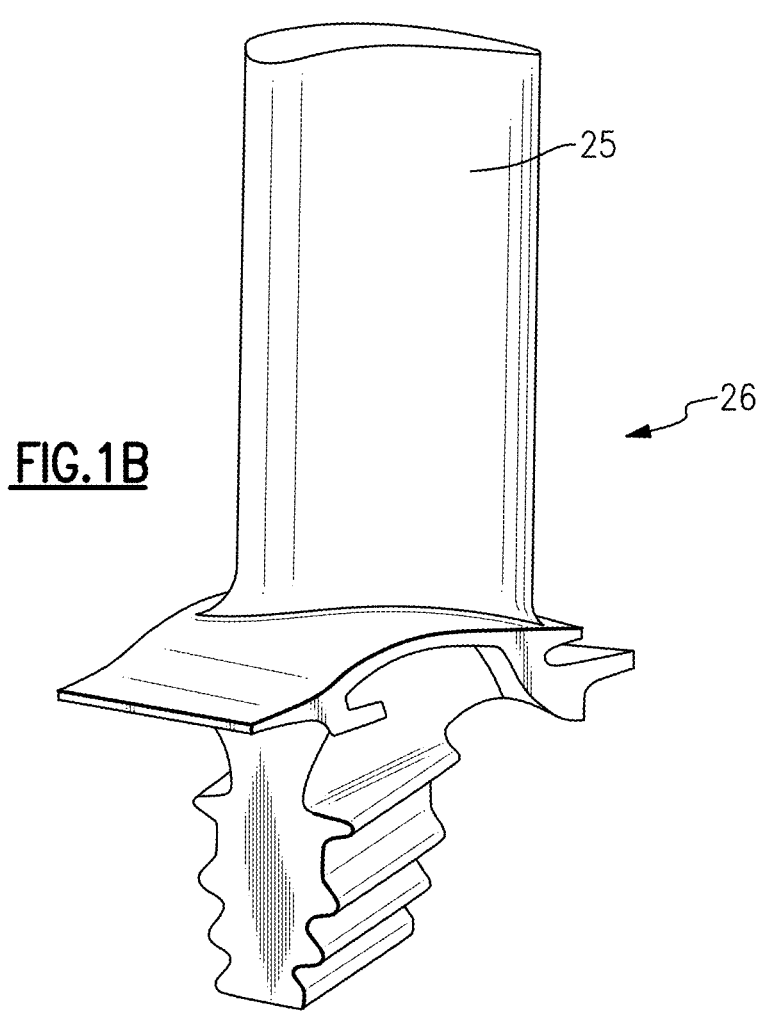

METHOD TO REQUALIFY DIE AFTER STORAGE

BACKGROUND

This application relates to bringing a previously utilized cast metal die out of storage, and requalifying it for production.

Dies are utilized in number of applications. One type die is a metal cast die. In such a die metal is injected into a cavity, and forms a component.

One common use of such dies is to form components having an airfoil such as turbine blades, static vanes, compressor blades, and compressor static vanes.

In the prior art after manufacture, and before moving to production the die must be certified. Typically, the die is utilized to form a relatively large number of components to be inspected. As an example, there may be on the order of two dozen components made.

The formed components are then subject to detailed inspection to ensure that they meet part requirements. It is only after the inspection of the produced components is passed that the die is moved towards production.

All of these steps put in place a long lead time between ordering a die, and having it ready for production.

At some point the die may be taken out of production such as when sufficient parts have been produced. Currently, if a die is stored for more than a predetermined period of time the entire qualification process must be repeated once the die is brought back into service.

SUMMARY

A method of requalifying a die after storage includes the steps of running production parts on a die, stopping production for a period of time, taking a pre-storage 3D scan of the die, storing the die for a period of time, taking a post storage 3D scan of the die, comparing the post storage 3D scan information to the pre-storage 3D scan information, and requalifying the die for use in production should the post storage 3D scan be found to be sufficiently close to the pre-storage 3D scan.

These and other features will be best understood from the following drawings and specification, the following is a brief description.

BRIEF DESCRIPTION OF THE DRAWINGS

FIG. 1A schematically shows a metal cast die performing a component.

FIG. 1B shows a gas turbine engine component which may be formed by a die such as the FIG. 1A die.

DETAILED DESCRIPTION

Figure 2:
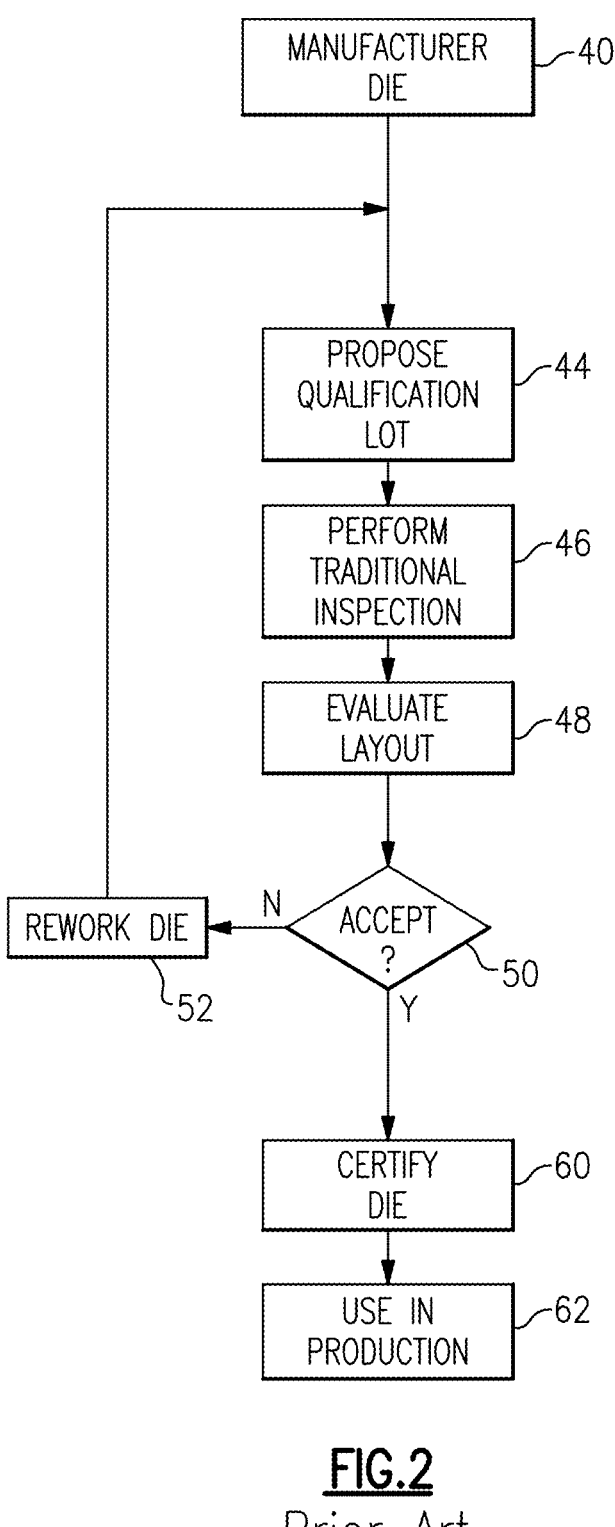
FIG. 2 is a flow chart of a method for certifying a die initially.

FIG. 1A shows a die 20 schematically. As known, a cavity 22 receives injected metal from a source 24.

One component which may be formed by such a die is shown in FIG. 1B. Here a turbine blade 26 has an airfoil 25. While a turbine blade is specifically disclosed, it should be understood that other gas turbine engine components may be formed using metal cast dies such as the FIG. 1A die.

As well known, airfoils are complex structures, and have demanding dimensional challenges in forming the desired structure. For this reasons, dies to form an airfoil are subject to intense qualification tests before being utilized to make production airfoils.

In the prior art, and before a die is utilized in production, it must first be certified.

In one common method of certification, the die is built, and then utilized to produce what is called a qualification lot. As an example, this may be on the order of two dozen components, or more. Those produced components are then inspected and compared to desired dimensions, etc. It is only after this inspection has been passed that the die would be moved toward production. In the prior art, this qualification was performed not only for an initial die, but for all subsequent dies made to be similar to an initial or master die.

FIG. 2 shows existing method 38 for qualifying a die. At step 40, a die may be designed and built.

A qualification lot is produced at step 44.

A traditional inspection is then performed on the qualification lot at step 46. The results, or the layout, are evaluated at step 48.

At step 50, a decision is made whether to accept the layout. If not, the die is reworked at step 52, and the flow chart returns downstream of step 40.

If the layout is accepted at step 50 then, the die is certified at step 60 and is used in production at step 62.

As mentioned above, the qualification of the die is a very time consuming process. The method of this disclosure will shorten the requalification purpose for a die which has been out of use and stored for a minimum period of time. Currently dies must be recertified if they have been stored for greater than two years, as an example.

If the period of time is not greater than a minimum then the requalification steps need not be performed.

Figure 3:
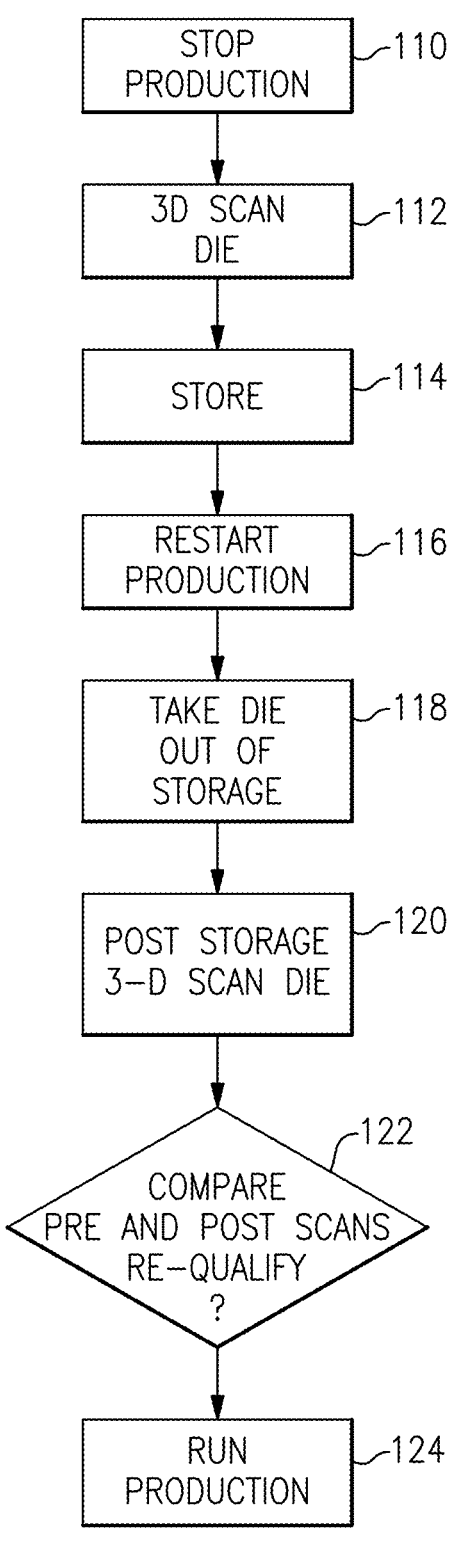
FIG. 3 is a flow chart of a method for requalifying a die after storage.

Thus, as shown in FIG. 3, at some point production may be stopped with a particular die at step 110. At that point a 3D scan on the die is performed at step 112. In one embodiment, structured light scanning techniques are utilized. Pictures should be taken showing the entire die from each side and a close up of any particular area of interest.

Figure 4:
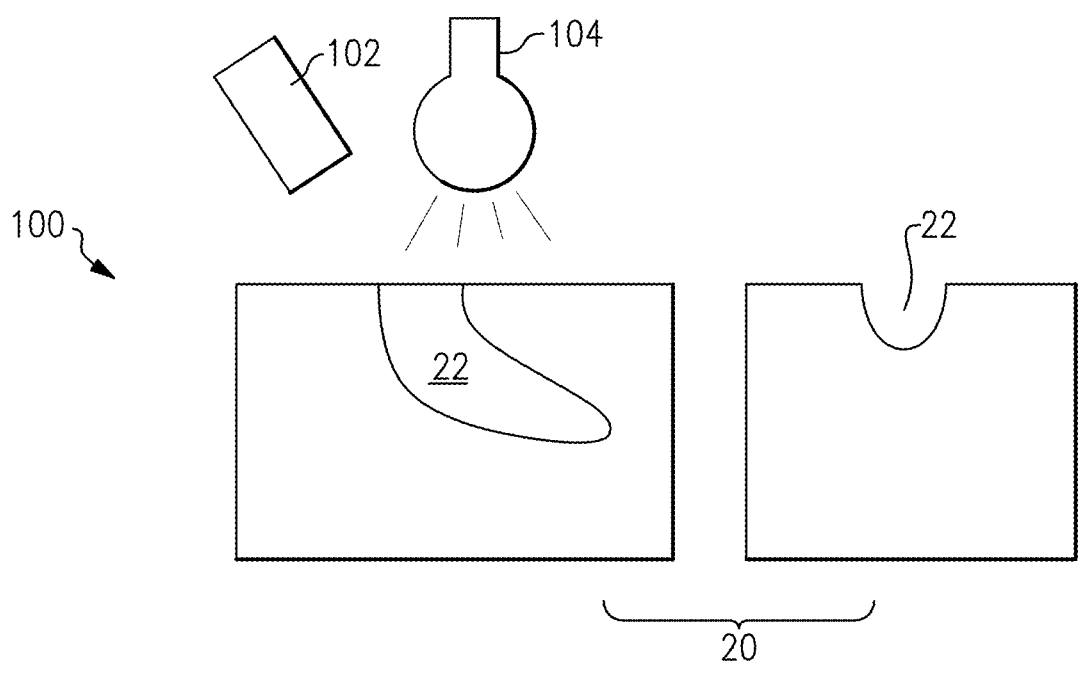
FIG. 4 shows a scanning system.

FIG. 4 schematically shows a simple system 100 for performing the 3D scans. As shown, a camera 102 takes photos of the interior of the cavity 22 as illuminated by a structured light scanning system 104. Other type scanning systems may be used.

The die may then be stored at step 114. At some subsequent point a decision may be made to restart production of the part from the die at step 116.

Assuming the die has been stored for a minimum period of time it will need to be requalified. In the prior art, the FIG. 2 method would be used.

At step 118 the die is taken out of storage. A post storage 3D scan of the die is performed at step 120. The post storage 3D scan will be done with the exact same angle, photos, etc. from the pre-storage die scan.

Prior to the post storage 3D scan, the die is cleaned.

Figure 5:
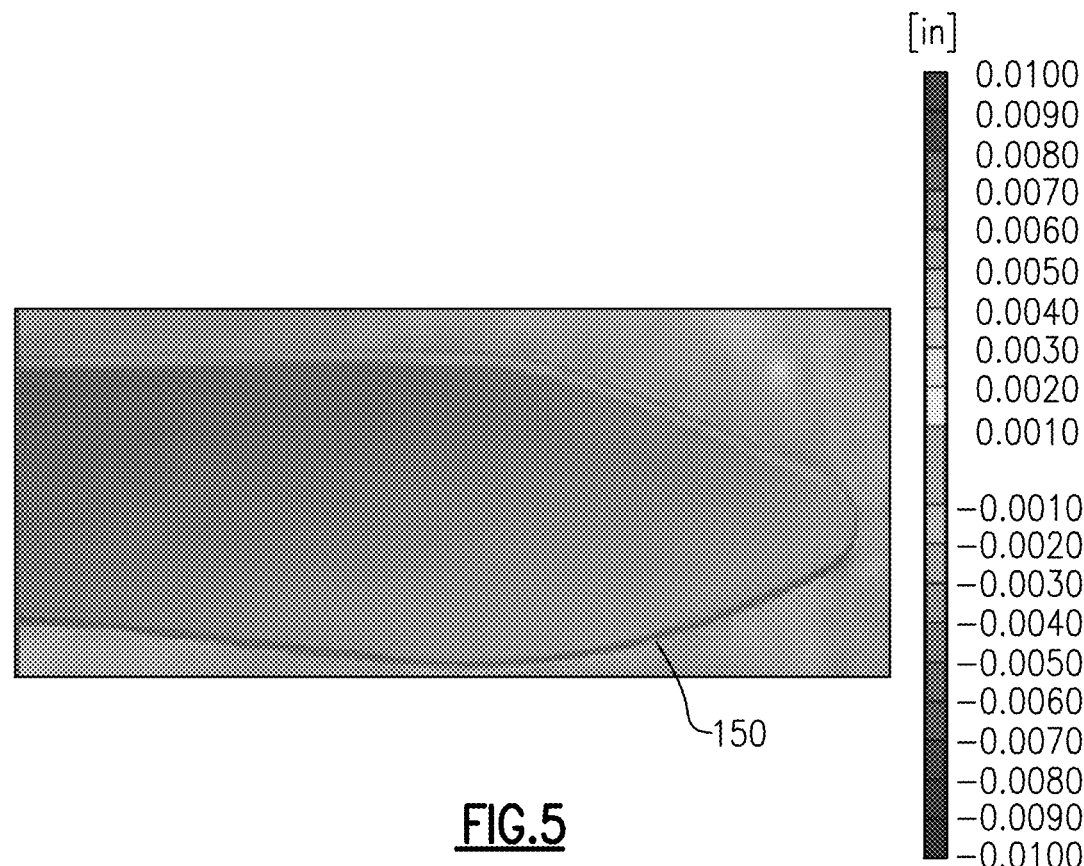
FIG. 5 shows a map comparing two scans.

At step 122 the scanned information from the pre and post storages scans are compared to each other to requalify the die. A before and after 3D scan overlay comparison of the concave side of the tool. A map 150 in FIG. 5 shows that the tool has not changed, scale is on the right side of the image.

In one embodiment, the pre storage 3D scan is provided with the best fit overlay to the post storage 3D scan. The evidence which is looked at may be in the form of a simple product of the die thickness across both die halves and at each die cavity end. These inspections will determine the die functionality has not changed.

If the die is requalified after this step 122 then the die is used in production again at step 124.

A method of requalifying a die after storage under this disclosure could be said to include the steps of running production parts on a die, stopping production for a period of time, taking a pre-storage 3D scan of the die, storing the die for a period of time, taking a post storage 3D scan of the die, comparing the post storage 3D scan information to the pre-storage 3D scan information, and requalifying the die for use in production should the post storage 3D scan be found to be sufficiently close to the pre-storage 3D scan.

In another embodiment according to the previous embodiment, the die is used to form a component after being requalified.

In another embodiment according to any of the previous embodiments, the component has an airfoil.

In another embodiment according to any of the previous embodiments, the pre-storage and post storage 3D scans utilize structured light scanning.

In another embodiment according to any of the previous embodiments, if the period of time is not greater than a minimum then the post storage steps are not performed.

In another embodiment according to any of the previous embodiments, prior to the post storage 3D scan, the die is cleaned.

In another embodiment according to any of the previous embodiments, the minimum period of time is at least one year.

In another embodiment according to any of the previous embodiments, the minimum period of time is at least two years.

In another embodiment according to any of the previous embodiments, the die is a cast metal die, and the cavity receives a supply of molten metal when operating in production.

In another embodiment according to any of the previous embodiments, the 3D scans of pre-storage and post storage utilize structured light scanning.

In another embodiment according to any of the previous embodiments, if the period of time is not greater than a minimum then the post storage steps are not performed.

In another embodiment according to any of the previous embodiments, prior to the post storage 3D scan, the die is cleaned.

In another embodiment according to any of the previous embodiments, the minimum period of time is at least one year.

In another embodiment according to any of the previous embodiments, the minimum period of time is at least two years.

In another embodiment according to any of the previous embodiments, the die is a cast metal die, and the cavity receives a supply of molten metal when operating in production.

In another embodiment according to any of the previous embodiments, if the period of time is not greater than a minimum then the post storage steps are not performed.

In another embodiment according to any of the previous embodiments, the minimum period of time is at least one year.

In another embodiment according to any of the previous embodiments, prior to the post storage 3D scan, the die is cleaned.

In another embodiment according to any of the previous embodiments, prior to the post storage 3D scan, the die is cleaned.

In another embodiment according to any of the previous embodiments, the die is a cast metal die, and the cavity receives a supply of molten metal when operating in production.

Although embodiments have been disclosed, a worker of skill in this art would recognize that modifications would come within the scope of this disclosure. For that reason, the following claims should be studied to determine the true scope and content.

What is claimed is:

1. A method of requalifying a die after storage comprising the steps of:

running production parts on a die;

stopping production for a period of time;

taking a pre-storage 3D scan of the die;

storing the die for a period of time;

taking a post storage 3D scan of the die;

comparing the post storage 3D scan information to the pre-storage 3D scan information; and requalifying the die for use in production should the post storage 3D scan be found to be sufficiently close to the pre-storage 3D scan.

2. The method as set forth in claim 1, wherein the die is used to form a component after requalification.

3. The method as set forth in claim 2, wherein the component has an airfoil.

4. The method as set forth in claim 3, wherein the pre-storage and post storage 3D scans utilize structured light scanning.

5. The method as set forth in claim 4, wherein if the period of time is not greater than a minimum then the post storage steps are not performed.

6. The method as set forth in claim 5, wherein prior to the post storage 3D scan, the die is cleaned.

7. The method as set forth in claim 5, wherein the minimum period of time is at least one year.

8. The method as set forth in claim 7, wherein the minimum period of time is at least two years.

9. The method as set forth in claim 8, wherein the die is a cast metal die, and the cavity receives a supply of molten metal when operating in production.

10. The method as set forth in claim 1, wherein the 3D scans of pre-storage and post storage utilize structured light scanning.

11. The method as set forth in claim 10, wherein if the period of time is not greater than a minimum then the post storage steps are not performed.

12. The method as set forth in claim 11, wherein prior to the post storage 3D scan, the die is cleaned.

13. The method as set forth in claim 12, wherein the minimum period of time is at least one year.

14. The method as set forth in claim 13, wherein the minimum period of time is at least two years.

15. The method as set forth in claim 13, wherein the die is a cast metal die, and the cavity receives a supply of molten metal when operating in production.

16. The method as set forth in claim 1, wherein if the period of time is not greater than a minimum then the post storage steps are not performed.

17. The method as set forth in claim 16, wherein the minimum period of time is at least one year.

18. The method as set forth in claim 17, wherein prior to the post storage 3D scan, the die is cleaned.

19. The method as set forth in claim 1, wherein prior to the post storage 3D scan, the die is cleaned.

20. The method as set forth in claim 1, wherein the die is a cast metal die, and the cavity receives a supply of molten metal when operating in production.

* * * * *